United States Patent [19]
Lecomte

[11] Patent Number: 4,983,049
[45] Date of Patent: Jan. 8, 1991

[54] LINEAR PRECISION GUIDE
[76] Inventor: Marc Lecomte, 9, rue Plaisance, F-33700 Merignac, France
[21] Appl. No.: 469,962
[22] Filed: Jan. 25, 1990
[30] Foreign Application Priority Data Jan. 25, 1989 [FR] France .................................. 89 01092

[51] Int. Cl.$^5$ ............................................ F16C 29/06
[52] U.S. Cl. ........................................................ 384/45
[58] Field of Search ............................. 384/45, 43, 44; 464/168

[56] References Cited
U.S. PATENT DOCUMENTS

| | | | |
|---|---|---|---|
| 4,695,170 | 9/1987 | Teramachi | 384/43 |
| 4,773,770 | 9/1988 | Osawa et al. | 384/45 |
| 4,828,402 | 5/1989 | Osawa | 384/45 |
| 4,869,600 | 9/1989 | Tonogai | 384/45 |

Primary Examiner—Lenard A. Footland
Attorney, Agent, or Firm—Horst M. Kasper

[57] ABSTRACT

A linear precision guide comprises a guide rail (1) having an outer profile of a prismatic shape inscribed in a circle and exhibiting three arcs (3, 4). The arcs (4) are equal and their successive extremities (5) are connected by a lower plane side-face (6). The four other extremities (8) of the arcs are connected by two recessed plane sides (9). Each of the recessed plane sides comprises outer connections in the form of circular rail recesses (10). Said recessed sides and recesses serve, following precision-grinding, for races of sets of movable balls (19, 19a) supported on the wings (17) of the block (14) enclosing the rail (1) supported on the grooves and ducts (18, 21). The sets of balls (19, 19a) are supported by means of a lower housing (25) and of a tongue (32). Said housing (25) is provided with inner circular grooves (29) allowing the recirculation of the lower balls (19) during the displacement of the block (14). The block (14) is provided with a borehole duct (24) for the recirculation of the intermediary balls (19a). The connection of the grooves (18), ducts (21), grooves (23) and borehole duct (24) is provided by circular grooves provided at the ends of the housing (25) and on the end parts.

31 Claims, 8 Drawing Sheets

LINEAR PRECISION GUIDE

BACKGROUND OF THE INVENTION

1. Field of the Invention

The present invention relates to a linear precision guide of the type comprising a rail and a ball bearing block.

2. Brief Description of the Background of the Invention Including Prior Art

Linear precision guides are known which comprise at least one circular section rail and a sliding bushing equipped with inner ball circuits enabling the transfer of said bushing. This type of guide permits large and small displacements. In the case of small displacements, the rail is fixed to supports at its extremities and the bushing is closed. In the case of large displacements requiring the abutment of several rails and the intermediary fixation of said rails by one or more supports, the bushing is open to allow the passage of the support or supports, although the abutment of rail sections is easily accomplished as the circular section makes it possible to carry out perfectly concentric boring operations designed to receive assembly pins. The guide is limited in load on account of the point contact of the balls with the rail and, furthermore, the circular rail section does not ensure retention during rotation which calls for the use of a second parallel rail to compensate for this drawback. For the open bushings, the load capacity is limited on account of their elasticity.

There are further known guides comprising a ball-bearing bushing sliding on a triangular rail where each vertex is provided with grooves on both sides, in which grooves the balls of the bearing travel. This type of guide makes it possible to bear greater loads than the guides previously described due to the fact that the balls travel in the grooves and allow the transmission of couples and, as a result, to obtain a combined transfer/-rotation movement. However, the displacements are limited to reduced lengths, given the fact that the rail can only be fixed at its extremities.

Linear guides are also known which comprise prismatic-section rails provided with at least one groove on each of their lateral faces serving as the race for movable balls maintained in the grooves disposed on either side of the inner jaws of the block and whose endless movement is obtained by a return corridor disposed in the said jaws, as described in the French Patent No. 2,546,995, 2,516,612, 2,545,557, 730,922, 2,302,446. This type of guide presents positive advantages, in particular at the contact level of the balls in the grooves, which allow to increase the load capacity, their reduced dimensions and their high strength on account of the direct fixation of the rail to the frame, the disposition of the balls on the lateral faces of the rail making it possible to support transverse couples. This type of guide has certain disadvantages and requires considerable rectification operations, on the one hand, for fixation to the frame, especially of those with two reference faces at 90 degrees, for the rail and for those of the support frame bearing the rail and, on the other hand, for realizing guides of larger lengths which call for the abutment of several rails. This operation to obtain a perfect alignment of said rails is delicate since it is almost impossible, as is the case with the triangular rail sections, to realize cylindrical boring operations at the extremities in a concentric manner so as to receive assembly pins, just as it is also impossible to combine transfer and rotation movements.

In all the previously described linear guides, the blocks or bushings are made up of a very large number of complex elements which burden its construction with costs.

SUMMARY OF THE INVENTION

PURPOSES OF THE INVENTION

It is the object of the present invention to provide for a linear precision guide which is not encumbered with the previously described drawbacks.

These and other objects and advantages of the present invention will become evident from the description which follows.

BRIEF DESCRIPTION OF THE INVENTION

The present invention provides a linear precision guide comprises a frame, a guide rail having a prismatic shape, and channels and grooves serving as a race. A slide block including movable balls is supported on the grooves and channels. The guide rail is inscribed in a circle and presents at least three circular portions of arcs having extremities and permitting the support of cutting or precision-grinding machine tool jaws. A lower plane sideface is intended, after precision-grinding, to rest on the frame. Successive extremities of two of the arcs are connected by said plane side. Two recessed plane sides connect opposite extremities of the two arcs with a third arc. The two plane sides comprise end connections in the form of circular rail recesses which serve, after precision grinding, as the race for the sets of movable balls maintained on the block. A central block groove is disposed on the block containing the guide rail. Wings are attached to the block having a lower inner end part and an upper inner end part. One lower set of balls is supported in a lower circular housing groove disposed in the lower inner end part of each of the wings, and an intermediary set of balls is supported in the circular intermediary block groove between the lower inner end part and the upper inner end part of each wing. One duct, formed as a circular groove, is provided in the lower inner end part of the wings for the lower set of balls. Another duct is provided by a borehole duct furnished in each of the wings for the intermediary set of balls. The races formed by the lower housing groove and intermediary block groove are connected to the ducts and permit a continuous recirculation of the two sets of balls during displacement of the block. The connection of the lower housing groove and the intermediary block groove with the ducts is furnished by an inner circular housing groove for a lower set of balls and by an end-part channel for an intermediary set of balls. Said grooves are fashioned in the end parts of the block. A single block housing is fixed under each wing of the block for supporting the two sets of balls on the lower circular housing groove and on the circular intermediary block groove, respectively.

The guide rail can be hollow or solid. The arcs of the guide rail can be equal and distributed along the contour of the same radius and center. The arcs of the guide rail can also be unequal and distributed along the contour of the same radius and center.

The rail channel can be disposed at the center of the plane side connecting the successive extremities of the arcs. The rail channel can be constructed such to receive key segments for a centering and adjustment of the straightness of the rail on the frame.

The recessed hollow sides, connecting the two arcs with the third arc, are disposed in a symmetrical and slanted manner. The parallel and symmetrical sides, connecting the two arcs with the third arc, can be disposed perpendicular to the plane side. Two parallel sides can be disposed perpendicular to the plane sides. The parallel sides can have different dimensions between the circular rail recesses. The dimensions of the two arcs can be unequal and the extremities of the third arc can be asymmetrical.

The vertical recessed plane side and the slanted recessed plane side can be disposed perpendicular to the lower plane side-faces. The two arcs are unequal and the third arc exhibits asymmetrical extremities. An upper plane side-face can be disposed in the upper part of the rail. Said plane side-face can be disposed parallel to the lower plane side face resting on the frame. These plane side-faces can generate equal and symmetrical arcs. Said upper plane side-face can be disposed parallel to the lower plane side-face resting on the frame. These plane sides can generate unequal and asymmetrical arcs.

Each single-block housing affixed in the lower part of the wings of the block can be provided in the upper section of the base with an outer circular housing groove and an inner circular groove. The outer circular housing groove can serve to complete the inner circular groove of the block for the lower set of balls. The inner circular groove can complete the circular groove forming the duct in order to form with the shoulder the recirculation corridor of the lower set of balls. The lower balls and the intermediary balls can be supported in the lower circular housing groove, the outer circular housing groove, and in the circular intermediary block groove by means of the lateral tongue integral with the ends of the single-block housing. The single-block housing can be provided with horizontal lateral faces. Said lateral faces can be slanted and plane in order to conform to the profile of the sets of lower and intermediary balls while retaining an passage opening passage for a portion of the lower and intermediary balls and their support on the races of the rail.

The lateral faces can be slanted and concave in order to conform to the profile of the sets of lower and intermediary balls while retaining a passage opening for a portion of the lower and intermediary balls and their support on the races of the rail.

Inner circular housing grooves can be disposed at the end of the housings. An internal roundness can be provided at the end of the housings. The corridor and the lower circular housing groove and outer circular housing groove can be connected by inner circular housing grooves provided at the extremity of housings. The internal roundness can facilitate a circulation of the lower and intermediary balls. The internal roundness can be extended to the upper level of the set of intermediary balls and can be embedded in an end-part recess provided in each end part and in an end-part channel creating the connecting corridor between the borehole duct and the circular intermediary block groove.

The intermediary set of balls can be maintained in connecting channels by means of steel wires, tongues, and formed elements. A single-block housing can maintain the lower set of balls in the lower part of each wing in block grooves as well as in the corridor which is blocked by the base. Said single-block housing can be provided with a central tongue. Said tongue can fit into a lower-wing channel provided on the lower extremity of each wing. Circular housing grooves can be provided at the extremities of the single-block housing. Said circular housing grooves can connect the block grooves, provided in the lower part of each wing, with the corridors to permit the circulation of the lower balls. The circulation can be facilitated by an inner roundness provided at the extremities of the tongue. Said inner roundness ca extend vertically such until it is perpendicular to the end-part channel provided in the end parts embedded in the end-part channel and in the end-part recesses facilitating the circulation of the intermediary set of balls.

The rail can have a rail channel, where the rail, resting in the coarse state on its plane lower side, can be centered and adjusted in straightness on the frame by means of pins which fit into the borehole ducts distributed over the length of the rail and on the frame.

The upper face of the block and the central block channel can exhibit a plane or circular surface. The corridor and the outer circular housing groove of the single-block housing can be connected by means of a partial circular groove, the extension being disposed in the end part. The corridor and the block groove at their extremities at the single-block housing can be connected by means of a partial housing groove, where an extension can be disposed in the end part.

The invention relates to a linear precision guide comprising at least one prismatic guide rail and a slide block with movable balls supported by grooves and channels. The grooves and channels serve as the race. The hollow or solid section guide rail is set in a circle and presents at least three circular portions of the same radius and center. These circular portions are distributed in such a way as to receive the support of the cutting or precision-grinding machine tool jaws. This makes it possible to accurately determine the axis of the rail and to carry out the machining of the extremities for the precise abutment of rails between themselves for example by pins. The circular portions can have equal or unequal arcs distributed symmetrically or asymmetrically. Two successive arcs are linked by their successive extremities by a plane side designed to be machined or precision-ground and to rest on a frame. A channel can be disposed in its center which, after machining or precision-grinding, receives key segments to center the rail and to adjust its straightness on the frame. The other extremities of the two arcs are connected with the opposite extremities of one or two upper arcs by two recessed, symmetrical or asymmetrical parallel plane sides. Each of the plane sides comprises end connections in the shape of circular grooves. These grooves serve, after machining or precision grinding, as races for movable balls which are maintained on the wings of a block surrounding the rail in the channels or circular grooves disposed in the said wings, and in particular a groove at each lower inner extremity and an intermediary groove on each of the inner faces of the said wings. Each block race is extended and connected to a duct provided in the material constituting the body of the block so as to allow the continuous recirculation of the balls during displacement of the latter. In particular, there is provided a groove on the lower face of each wing for the balls of lower races and through a bore made in the wings for balls of the intermediary races. The extension of the races allows the connection with the ball recirculation ducts realized by means of a circular channel or groove disposed in a lower single-block housing and in the end pieces of the block. The balls are maintained on the block races by means of lower housings and tongues integral with said housings, by means of housings and steel wires, or by means of the lower housings and an element formed in metal or in a synthetic material.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
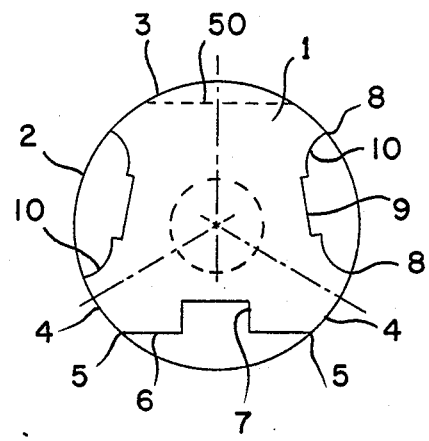
FIG. 1 is a cross-sectional view of a coarse guide rail before machining or precision-grinding.
Figure 2:
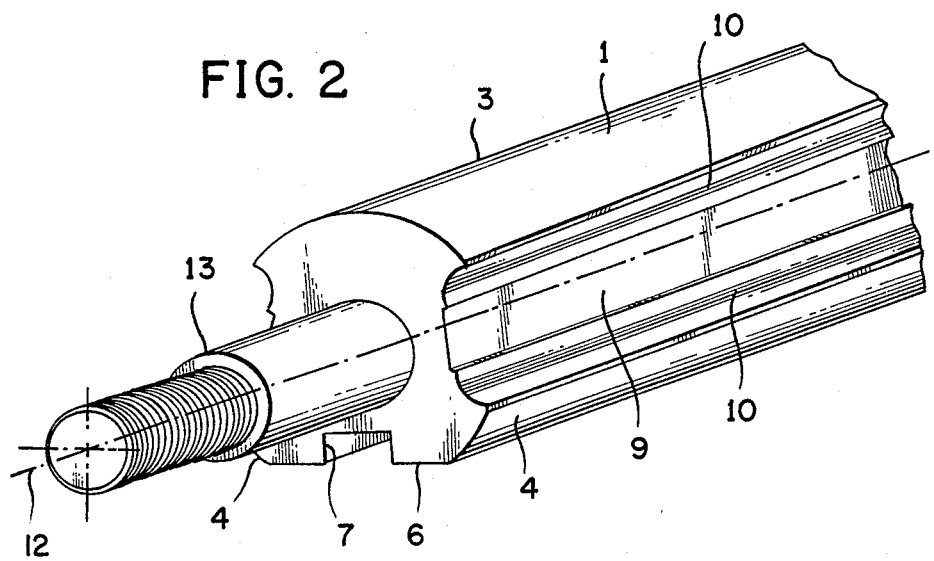
FIG. 2 is a perspective view of a guide rail and a block, following precision-grinding and machining of its extremities.

As illustrated in FIGS. 1 and 2, the rail 1 of the linear guide in its coarse state has a hollow or solid section with a prismatic external shape inscribed in a circle 2 presenting three circular portions or arcs 3 and 4 of the same radius and center. The arcs 3 and 4 are distributed so as to receive the support of the cutting or precision-grinding machine tool jaws. This makes it possible to accurately determine the axis 12 of the rail 1 and therefore to carry out a machining or boring operation for extremities receiving an abutment pin 13 of, for example, two rails 1. The circular portions or arcs 4 exhibit equal curved sections while the arc 3 has a larger curved section. The successive extremities 5 of the arcs 4 are interlinked by means of a plane rail side-face 6. The plane rail side-face 6 can exhibit in its center a rail channel 7. After precision-grinding, the plane rail side-face 6 is designed to rest on a frame, not illustrated, and the rail channel 7, after precision-grinding, receives key elements, not illustrated, permitting the centering of the rail 1 on the frame while allowing the adjustment of its straightness. The extremities 8 of the equal arcs 4 and the unequal arc 3 are connected by two symmetrically and obliquely disposed, recessed plane sides 9. The connecting extremities of the recessed plane sides 9 each exhibit a circular rail recess 10 which, after precision-grinding, are designed to serve as races for the movable balls maintained on the blocks. Once precision-ground and positioned on the frame, the rail 1 is fixedly mounted in a conventional manner by means of screws, not illustrated, distributed over length of the rail through notches 11, as illustrated on FIGS. 4 to 7. Without leaving the framework of the invention, the rail channel 7 may remain in its coarse state, the adjustment of straightness of the rail being carried out by pins inserted through bores, not illustrated, distributed along the length of the rail and on the frame. In this case it is possible not to provide a rail channel 7 for the rail.

Figure 3:
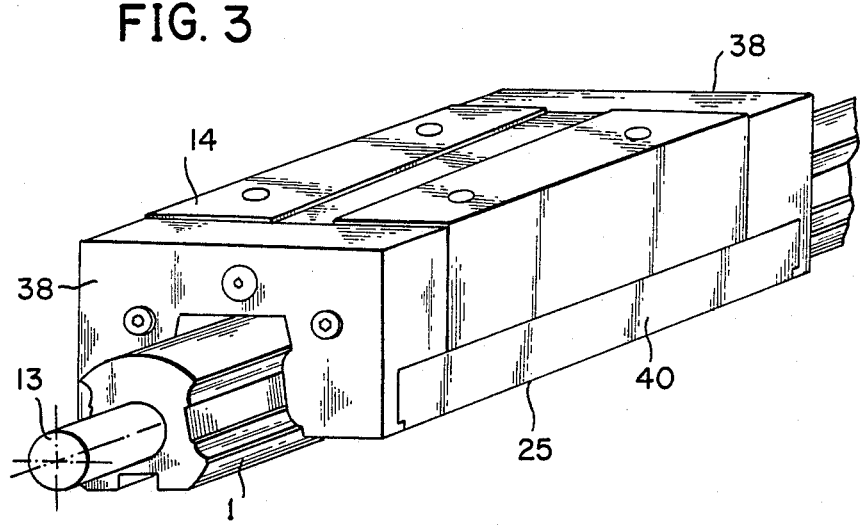
FIG. 3 is a perspective view of a rail and a block.
Figure 4:
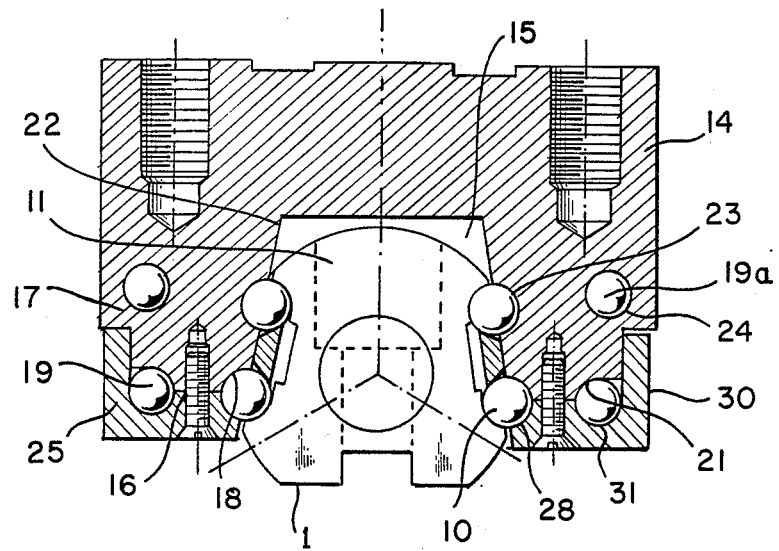
FIG. 4 is a cross-sectional view of a guide rail and a block.
Figure 8:
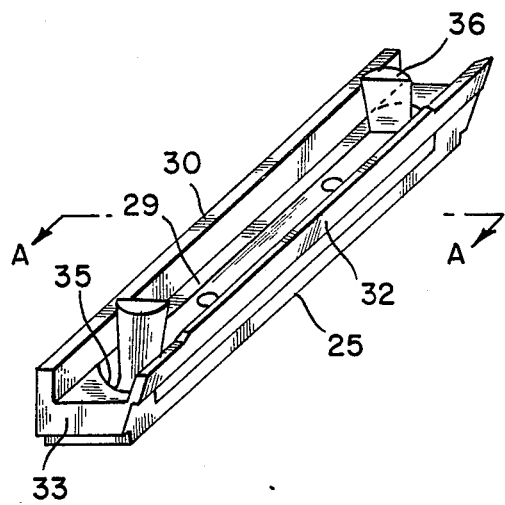
FIG. 8 is a perspective view of the lower single-block housing permitting support and recirculation of the balls in the races for the embodiment of FIG. 4.
Figure 8A:
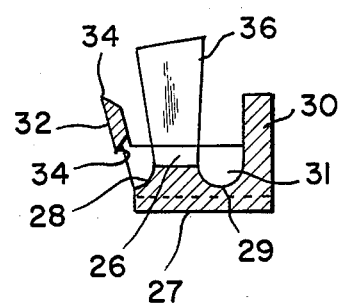
FIG. 8a is a cross-sectional view along section line A—A of FIG. 8.
Figure 10:
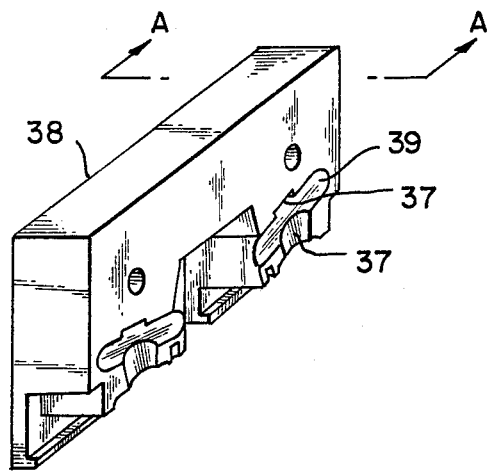
FIG. 10 is a perspective view of the ends of each block with the common parts.
Figure 10A:
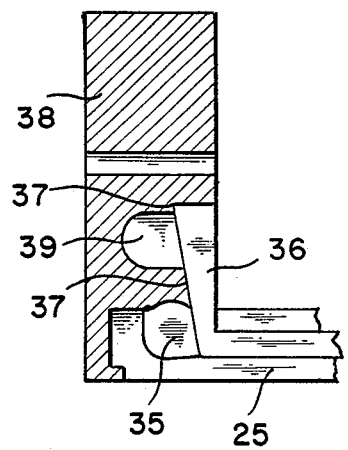
FIG. 10a is a cross-sectional view along section line A—A of the FIG. 10 of one of the ends of the block.
Figure 10B:
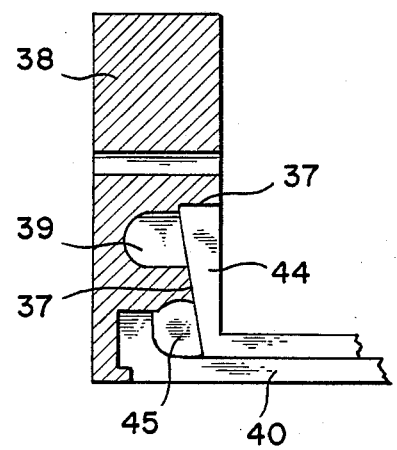
FIG. 10b is a cross-sectional view along section line A-A of FIG. 10 of the other end of the block.

According to FIGS. 3 and 4, a steel block 14 slides on the rail 1. The steel block 14 exhibits a central block channel 15. The central block channel 15 exhibits a section which is slightly larger than that of rail 1 so as to hold the rail 1. On the lower inner end 16 of each wing 17, there is provided a lower circular housing groove 18 receiving, supporting and serving as the race to a first lower set of balls 19 which are supported on the said housing grooves 18 and circular rail recess 10 of the rail 1. At the lower end 20 of the wings 17 there is provided a circular groove forming a channel duct 21 permitting the circulation and the recirculation of the said balls 19 during displacement of the block 14 on the rail 1. At an intermediary position between the lower inner end 16 of each wing 17 and the upper inner end 22, a circular intermediary block groove 23 is provided to receive, support and serve as the race to an intermediary second set of balls 19a which are supported by the intermediary block groove 23 and the circular rail recess 10 of rail 1. In order to allow circulation and recirculation of the intermediary set of balls 19a during the displacement of the block 14, a borehole duct 24 is disposed in the material constituting the block 14. In order to maintain balls 19 and 19a in the grooves 18 and 23 in the lower part of the wings 17, a single-block housing 25, illustrated in FIG. 8, in a moldable material, is mounted and fixed under each of the lower inner ends 16 of the wings 17. The upper section 26 of the base 27 is furnished with an outer circular housing groove 28 and an inner circular groove 29. The outer groove 28 supports the set of balls resting on the lower groove 18 while completing said groove. The inner circular groove 29 is designed to complete the channel duct 21 by forming with the shoulder 30 the recirculation corridor 31 for the lower set of balls 19. The supporting of the two sets of balls 19 and 19a on each wing 17 is obtained by a lateral tongue 32 which is integral with the extremities 33 of the singleblock housing 25. The position of the tongue 32 is such that it generates the support of balls 19 and 19a in the grooves, respectively, channel 18, 23, 28, while making an opening for the passage of a portion of the balls 19, 19a so that the latter rest on the races, formed by the circular rail recess 10, of rail 1. The said tongue 32 presents plane or concave, horizontal, lateral faces 34 which are on the bias so as to comply with the profile of the sets of balls 19 and 19a. At the extremities 33 of the single-block housing 25, the corridors 31 and the outer circular grooves 28 are connected by means of an inner circular housing groove 35. The internal roundness 36, facilitating the circulation of balls 19 and 19a, is extended to the upper level of the intermediary set of balls 19a and is embedded during assembly of the block 14 in the end-part recesses 37 provided for this purpose in the end parts 38, illustrated in FIG. 10, and in the end-part channel 39 creating the connecting corridor between the borehole duct 24 and the circular intermediary block groove 23. It is understood that the end parts 38 and the gasket seals, not illustrated, are assembled in a conventional manner, for example, by screws.

Figure 5:
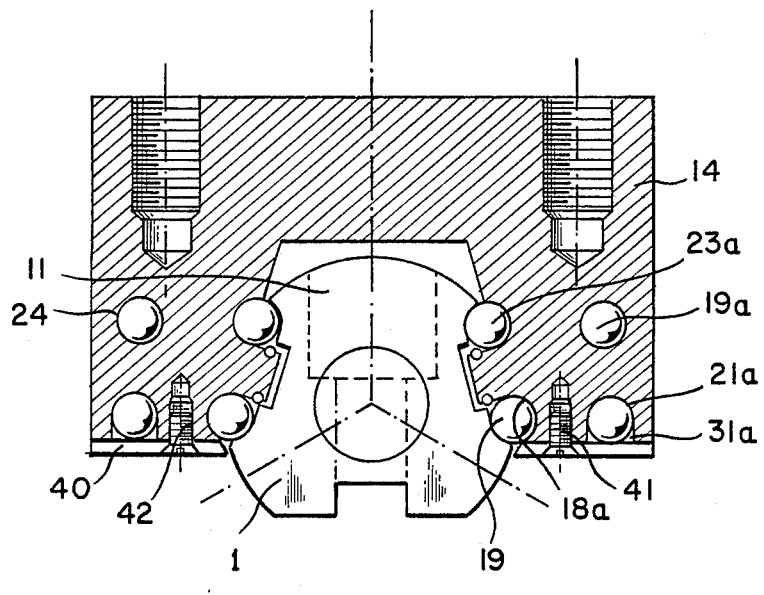
FIG. 5 is a cross-sectional view of a guide rail and a block, illustrating a first mode of supporting the balls in the races.
Figure 6:
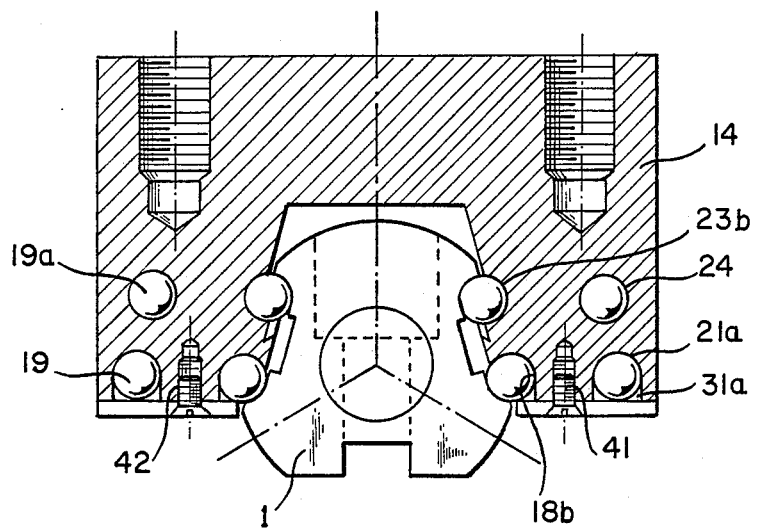
FIG. 6 is a cross-sectional view of a guide rail and a block, illustrating a second mode of supporting the balls in the races.
Figure 7:
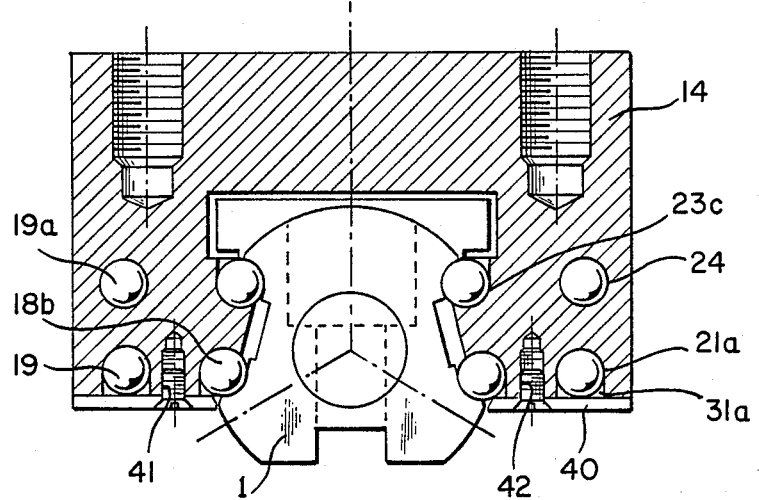
FIG. 7 is a cross-sectional view of a guide rail and a block, illustrating a third mode of supporting the balls in the races.
Figure 9:
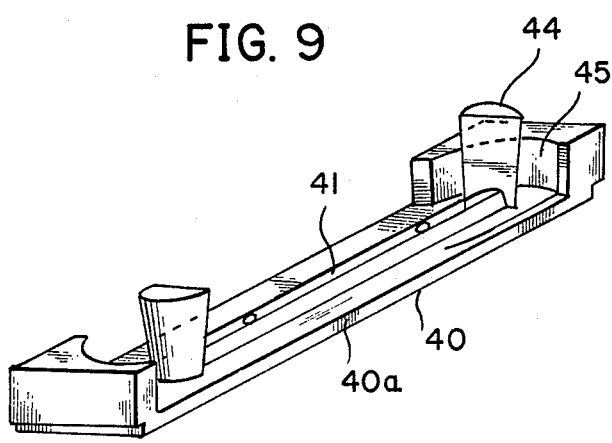
FIG. 9 is a perspective view of the lower single-block housing permitting support and recirculation of the balls for embodiments illustrated in FIGS. 5, 6, and 7.

FIGS. 5 to 7 illustrate embodiments showing various modes for the support of the sets of balls 19 and 19a and the associated machining operations. The lower set of balls 19 of a wing 17 of the block is supported by means of the single-block housing 40, as illustrated in FIG. 9. The single-block housing is provided with a tongue 41 fitted in its center. The tongue 41 is inserted into the lowerwing channel 42 provided under the lower end of the wing 17. A rounded vertical extension 44 is provided at the ends 43 of the tongue 41. This permits, as described above, to facilitate the circulation of the balls 19 and 19a in the circular housing grooves 45. The circular housing grooves 45 are provided at the ends of the single-block housing 40 connecting the block grooves 18a, 18b, with the corridor 31a whose open side is blocked by the base 40a. The end-part channel 39 of the end parts 38 connects the connecting channels 23a, 23b, 23c with the borehole ducts 24. The rounded vertical extension 44 is embedded into the end-part channel 39. The end-part recesses 37 are provided on the end parts 38. It is understood that the end parts 38 are adapted to permit the embedding of the ends of the singleblock housings 25 and 40.

Figure 11:
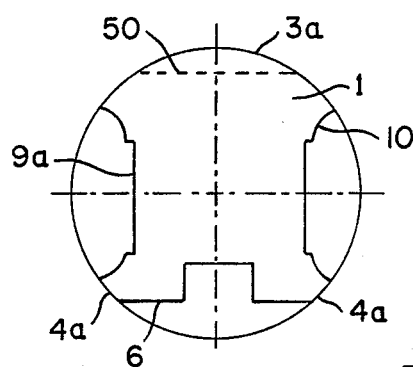
FIG. 11 is a first embodiment of the rail guide.
Figure 12:
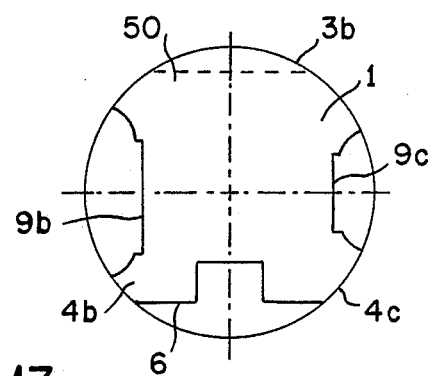
FIG. 12 is a second embodiment of the rail guide.
Figure 13:
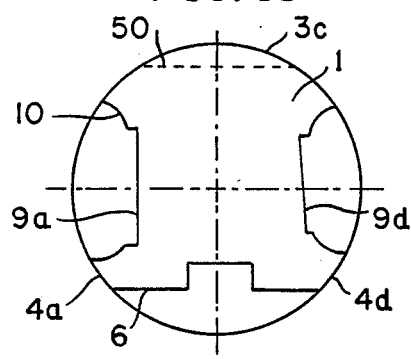
FIG. 13 is a third embodiment of the rail guide.

According to FIGS. 11 to 13, the parallel, recessed sides 9a can, in relation to the plane side 6, be made perpendicular and symmetrical, as illustrated in FIG. 11, and can exhibit symmetrical arcs 4a. The ends of the upper arc 3a are symmetrical between themselves. According to the embodiment of FIG. 12, the recessed plane sides 9b and 9c exhibit different dimensions between circular rail recesses 10. Therefore, the lower arcs 4b and 4c are unequal while the upper arc 3b is asymmetrical. Furthermore, as illustrated in FIG. 13, it is possible to provide a rail 1 exhibiting a recessed plane side 9a perpendicular to the plane side 6 and a recessed side 9d which is slanted. In this case, the arcs 4a, 4d are unequal and the arc 3c has asymmetrical extremities. For all the rails illustrated in FIGS. 1, 11, 12, and 13, it is possible, as shown by the dotted lines, in order to reduce the height of the central block channel 15 of the block, to design an upper plane rail side-face 50 parallel to the lower plane rail side-face 6. This embodiment design provides in the upper section two symmetrical and equal or asymmetrical arcs, according to the exemplified embodiments previously described. On the other hand, it is understood that according to the configuration of the rails, the blocks and their grooves are adapted to the said realized profiles. Without leaving the framework of the invention, the upper face of the block 14 and the central block channel 15 can exhibit a plane or a circular surface.

Figure 14:
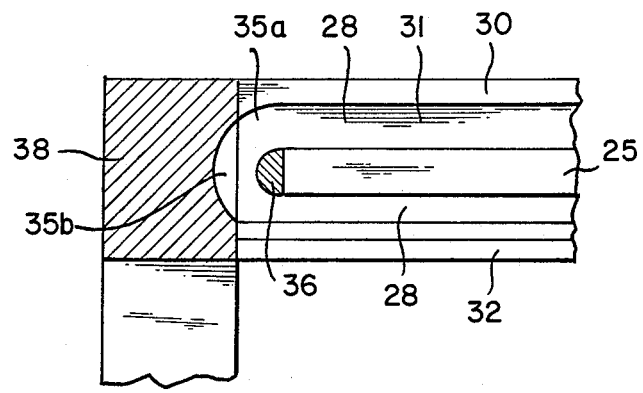
FIG. 14 is a top view onto a variant of the embodiment of the ends of the single-block housing illustrated in FIGS. 8 and 9 as well as the common ends of the blocks.
Figure 15:
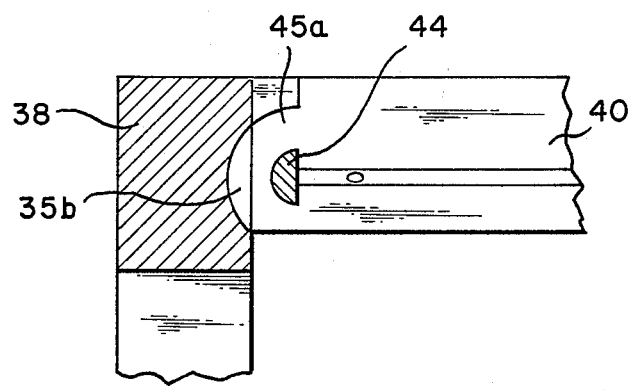
FIG. 15 is a top view onto another variant of the embodiment of the ends of the single-block housing illustrated in FIGS. 8 and 9 as well as the common ends of the blocks.
Figure 16:
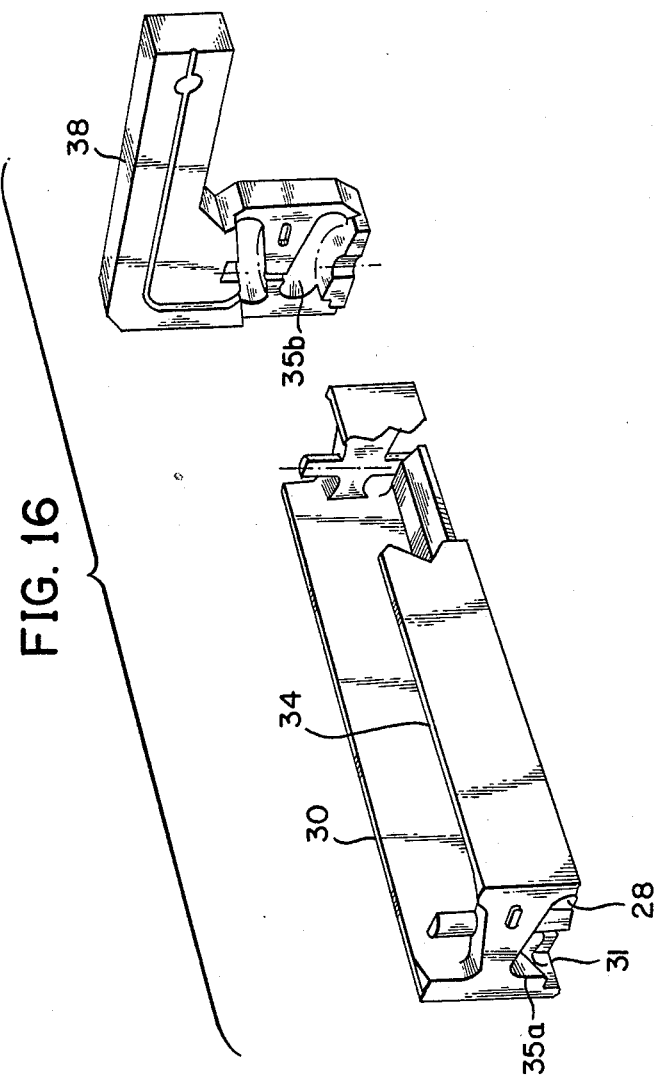
FIG. 16 is a perspective view of the embodiment illustrated in FIG. 14.

According to the embodiments of FIGS. 14, 15, and 16, at the extremity 33 of the single-block housing cage 25, the corridors 31 and outer circular housing grooves 28 are connected by means of a partial circular groove 35a. The extension 35b is disposed in the end parts 38. The same holds true for the single-block housing 40. The circular housing groove 45 is partial, its extension 35b being disposed as previously described in the end parts 38.

It will be understood that each of the elements described above, or two or more together, may also find a useful application in other types of guides differing from the types described above.

While the invention has been illustrated and described as embodied in the context of linear precision guide of the type comprising a rail and a ball bearing block, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A linear precision guide comprising
a frame;
a guide rail having a prismatic shape;
grooves serving as a race;
channels serving as a race;
a slide block including movable balls supported on the grooves and channels;
wherein the guide rail is inscribed in a circle and presents at least three circular portions of arcs having extremities and permitting the support of cutting or precision-grinding machine tool jaws;
a lower plane side-face intended, after precision-grinding, to rest on the frame, and wherein successive extremities of two of the arcs are connected by said plane side;
sets of movable balls;
a block;
two recessed plane sides for connecting opposite extremities of the two arcs with a third arc, and wherein the two plane sides comprise end connections in the form of circular rail recesses which serve, after precision grinding, as the race for the sets of movable balls maintained on the block; a central block groove disposed on the block containing the guide rail; wings attached to the block having a lower inner end part and an upper inner end part, wherein one lower set of balls is supported in a lower circular housing groove disposed in the lower inner end part of each of the wings, and an intermediary set of balls is supported in the circular intermediary block groove between the lower inner end part and the upper inner end part of each wing;

ducts, wherein one duct, formed as a circular groove, is provided in the lower inner end part of the wings for the lower set of balls, and wherein another duct is provided by a borehole duct furnished in each of the wings for the intermediary set of balls, and wherein the races formed by the lower housing groove and intermediary block groove are connected to the ducts and permit a continuous recirculation of the two sets of balls during displacement of the block;

wherein the connection of the lower housing groove and the intermediary block groove with the ducts is furnished by an inner circular housing groove for a lower set of balls and by an end-part channel for an intermediary set of balls, said grooves being fashioned in the end parts of the block;

a single block housing fixed under each wing of the block for supporting the two sets of balls on the lower circular housing groove and on the circular intermediary block groove, respectively.

2. The linear precision guide according to claim 1 wherein the guide rail is hollow.

3. The linear precision guide according to claim 1 wherein the guide rail is solid.

4. The linear precision guide according to claim 1 wherein the arcs of the guide rail are equal and distributed along the contour of the same radius and center.

5. The linear precision guide according to claim 1 wherein the arcs of the guide rail are unequal and distributed along the contour of the same radius and center.

6. The linear precision guide according to the claim 1, further comprising
a rail channel,
key segments,
wherein the rail channel is disposed at the center of the plane side connecting the successive extremities of the arcs, and wherein the rail channel is constructed such to receive key segments for a centering and adjustment of the straightness of the rail on the frame.

7. The linear precision guide according to claim 1, wherein
the recessed hollow sides, connecting the two arcs with the third arc, are disposed in a symmetrical and slanted manner.

8. The linear precision guide according to claim 1, further comprising
two parallel and symmetrical sides,
wherein the parallel and symmetrical sides, connecting the two arcs with the third arc, are disposed perpendicular to the plane side.

9. The linear precision guide according to claim 1, further comprising
two parallel sides disposed perpendicular to the plane sides, wherein the parallel sides have different dimensions between the circular rail recesses, and wherein the dimensions of the two arcs are unequal and the extremities of the third arc is asymmetrical.

10. The linear precision guide according to claim 1, further comprising
one vertical recessed plane side;
one slanted recessed plane side;
wherein the vertical recessed plane side and the slanted recessed plane side are disposed perpendicular to the lower plane side-faces, and wherein the two arcs are unequal and the third arc exhibits asymmetrical extremities.

11. The linear precision guide according to claim 1, further comprising
an upper plane side-face disposed in the upper part of the rail, wherein said plane side-face is disposed parallel to the lower plane side face resting on the frame, and wherein these plane side-faces generate equal and symmetrical arcs.

12. The linear precision guide according to claim 1, further comprising
an upper plane side-face disposed in the upper part of the rail, wherein said upper plane side-face is disposed parallel to the lower plane side-face resting on the frame, and wherein these plane sides generate unequal and asymmetrical arcs.

13. The linear precision guide according to claim 1, further comprising
a base having an upper section, wherein
each single-block housing affixed in the lower part of the wings of the block is provided in the upper section of the base with an outer circular housing groove and an inner circular groove;
a shoulder,
a recirculation corridor,
a lateral tongue integral with ends of the single-block housing,
wherein the outer circular housing groove serves to complete the inner circular groove of the block for the lower set of balls, and where the inner circular groove completes the circular groove forming the duct in order to form with the shoulder the recirculation corridor of the lower set of balls, where the lower balls and the intermediary balls are supported in the lower circular housing groove, the outer circular housing groove, and in the circular intermediary block groove by means of the lateral tongue integral with the ends of the single-block housing, where the single-block housing is provided with horizontal lateral faces, where said lateral faces are slanted and plane in order to conform to the profile of the sets of lower and intermediary balls while retaining an passage opening passage for a portion of the lower and intermediary balls and their support on the races of the rail.

14. The linear precision guide according to claim 13, wherein
the lateral faces are slanted and concave in order to conform to the profile of the sets of lower and intermediary balls while retaining a passage opening for a portion of the lower and intermediary balls and their support on the races of the rail.

15. The linear precision guide according to claims 13, further comprising
inner circular housing grooves disposed at the end of the housings;
an internal roundness provided at the end of the housings, wherein the corridor and the lower circular housing groove and outer circular housing groove are connected by inner circular housing grooves provided at the extremity of housings, and where the internal roundness facilitates a circulation of the lower and intermediary balls, wherein the internal roundness is extended to the upper level of the set of intermediary balls and is embedded in an end-part recess provided in each end part and in an end-part channel creating the connecting corridor between the borehole duct and the circular intermediary block groove.

16. The linear precision guide according to claim 15, wherein
the corridor and the outer circular housing groove of the single-block housing are connected by means of a partial circular groove, the extension being disposed in the end part.

17. The linear precision guide according to claim 1, wherein
the rail can have a rail channel, where the rail, resting in the coarse state on its plane lower side, is centered and adjusted in straightness on the frame by means of pins which fit into the borehole ducts distributed over the length of the rail and on the frame.

18. The linear precision guide according to claim 1, wherein
the upper face of the block and the central block channel exhibit a plane or circular surface.

19. The linear precision guide according to claim 1, wherein
the intermediary set of balls is maintained in connecting channels by means of steel wires, tongues, and formed elements, where a single-block housing maintains the lower set of balls in the lower part of each wing in block grooves as well as in the corridor which is blocked by the base,
wherein said single-block housing is provided with a central tongue, which fits into a lower-wing channel provided on the lower extremity of each wing,
wherein circular housing grooves are provided at the extremities of the single-block housing, where said circular housing grooves connect the block grooves, provided in the lower part of each wing, with the corridors to permit the circulation of the lower balls, and where the circulation is facilitated by an inner roundness provided at the extremities of the tongue where said inner roundness extends vertically such until it is perpendicular to the end-part channel provided in the end parts embedded in the end-part channel and in the end-part recesses facilitating the circulation of the intermediary set of balls.

20. The linear precision guide according to claim 19, wherein
the corridor and the block groove at their extremities at the single-block housing are connected by means of a partial housing groove, where an extension is disposed in the end part.

21. The linear precision guide comprising at least one guide rail with a prismatic shape and a slide block with movable balls supported on grooves and channels serving as the race and wherein the hollow or solid guide rail (1) of a prismatic shape is inscribed in a circle (2) and presents at least three circular portions of arcs (3, 4) which are equal or unequal and distributed along the contour of the same radius and center permitting the support of cutting or rectification machine tool jaws, the successive extremities (5) of the arcs (4) being connected by a lower plane rail side-face (6) designed, after rectification, to rest on a frame, the opposite extremities (8) of the arcs (4) and the arc (3) being connected by two recessed plane sides (9) and which both comprise end connections in the form of circular rail recesses (10) which serve, after rectification, as the race for sets of movable balls (19, 19a) maintained on a block (14) presenting a central block channel (15) containing the rail (1), the lower balls (19) being supported in a lower circular housing groove (18) fashioned in the lower inner part (16) of each of the wings (17) and the intermediary balls (19a) in the circular intermediary block groove (23) between the lower inner extremity (16) and the upper inner extremity (22) of each wing (17), the races or grooves (18, 23) being connected to ducts (21, 24) permitting permanent recirculation of the balls (19, 19a) during displacement of the block (14), the duct (21) being a circular groove fashioned in the lower extremity (16) of the wings (17) for the lower balls (19) and a borehole duct (24) provided in each wing (17) for the intermediary balls (19a), the connection of the races or grooves (18, 23) with the ducts (21, 24) being obtained by an inner circular housing groove (35) for the lower balls (19) and an end-part channel (39) for the intermediary balls (19a), said grooves being fashioned in the end parts (38) of the block (14), the balls (19, 19a) being supported on the races or grooves (18, 23) by means of a lower single-block housing (25) which is fixed to each wing (17) of the block (14).

22. The linear precision guide according to the claim 21, wherein in the center of the lower plane rail side-face (6) connecting the successive extremities (5) of the arcs (4) is fashioned or not a rail channel (7) designed to receive key segments for the centering and adjustment of the straightness of the rail (1) on the frame.

23. The linear precision guide according to claim 21, wherein the lower plane rail side-faces (6) connecting the arcs (4) to the arc (3) are provided in a symmetrical and slanted manner, where the parallel and symmetrical sides (9a) connecting the arcs (4a) to the arc (3a) are provided perpendicular to the lower plane rail side-face (6), where the sides (9b, 9c) are parallel and perpendicular to lower plane side-face (6) and have different dimensions between the circular rail recesses 10, where the arcs (4b, 4c) are unequal, and where the extremities of the arch (3b) are asymmetrical, wherein the side (9a) is perpendicular to the lower plane sides-faces (6) and the side (9d) is slanted, and where the arcs (4d, 4c) are unequal and the arc (3c) has asymmetrical extremities.

24. The linear precision guide according to claim 21, wherein the upper part of the rail (1) is provided with a plane upper side-face (50) parallel to the lower plane rail sideface (6) causing equal symmetrical or unequal and asymmetrical arcs.

25. The linear precision guide according to claim 21, wherein
each single-block housing (25) fixed in the lower inner end (16) of the wings (17) of the block (14) presents in the upper section (26) of the base (27) an outer circular housing groove (28) and an inner circular groove (29), where the groove (28) has the role of completing the inner circular groove (29) of the block for the lower set of balls (19) and the inner circular groove (29) of completing the duct (21) so as to constitute, with the shoulder (30) the recirculation corridor (31) of the lower set of balls (19), where the lower set of balls (19) and intermediary set of balls (19a) are maintained in the grooves 18, 28 and 23 by means of a lateral tongue (32) fixed to the extremities (33) of the single-block housing (25), whose horizontal lateral faces (34) are slanted so as to conform to the profile of the sets of balls (19, 19a) while retaining an opening for the passage of a portion of balls (19, 19a) and their support by the races formed by the circular rail recess (10) of the rail (1).

26. The linear precision guide according to claims 21, wherein the corridor (31) and the grooves (18, 28) are connected by inner circular housing grooves (35) provided in the extremity of the single-block housing (25) and whose internal roundness (36) facilitates circulation of the balls (19, 19a), the said roundness being extended to the upper level of the second set of balls (19a) and is embedded in an end-part recess (37) fashioned in each end part (38) and in an end-part channel (39) creating the connecting corridor between the borehole duct (24) and the circular intermediary block groove (23).

27. The linear precision guide according to claim 26, wherein the corridor (31) and the outer circular housing groove (28) of the single-block housing (25) are connected through a partial circular groove (35a), the extension (35b) being disposed in the end part (38).

28. The linear precision guide according to claim 21, wherein that the rail (1) which may or may not have a rail channel (7) in the coarse state on its lower plane rail side-face (6) is centered and adjusted in straightness on the frame by means of pins which fit into the bores distributed along the lenght of the rail (1) and on the frame.

29. The linear precision guide according to claim 21, wherein the upper face of the block (14) and the central block channel (15) may present a plane or circular surface.

30. The linear precision guide according to claim 21, wherein according to the support embodiment of the intermediary set of balls (19a) in connecting channels (23a) by the steel wires (23b) by tongues (23c) by formed elements, a lower single-block housing (40) maintains the lower set of balls (19) in the lower part of each wing (17) in the block grooves (18a,18b) as well as in the corridor (31a) which is blocked by the base (40a), wherein said single-block housing (40) exhibits a central tongue (41) which fits into the lower-wing channel (42) fashioned on the lower extremity of each wing (17), and wherein on the extremities of the single-block housing (40) are fashioned circular housing grooves (45) connecting the block grooves (18a, 18b) with the corridors (31) permitting the circulation of the lower balls (19), and wherein, in order to facilitate their circulation, a rounded interior surface is provided at the extremities of the tongue (41), said rounded interior extending vertically to be perpendicular with the end-part channel (39) and in the end-part recess (37) to ease circulation of the intermediary set of balls (19a).

31. The linear precision guide according to claim 30, wherein the corridor (31) and block groove (18a) in their extremities by the single-block housing (40) are connected by a partial housing groove (45a), its extension (35b) being disposed in the end wall (38).

* * * * *